US012658082B2

(12) United States Patent
Park et al.

(10) Patent No.: US 12,658,082 B2
(45) Date of Patent: Jun. 16, 2026

(54) DISPLAY DEVICE AND DRIVING METHOD THEREOF

(71) Applicant: LG Display Co., Ltd., Seoul (KR)

(72) Inventors: Hyojoon Park, Paju-si (KR); Mookyiung Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 300 days.

(21) Appl. No.: 18/396,666

(22) Filed: Dec. 26, 2023

(65) Prior Publication Data

US 2024/0257679 A1 Aug. 1, 2024

(30) Foreign Application Priority Data

Jan. 30, 2023 (KR) ........................ 10-2023-0011928

(51) Int. Cl.
*G09G 3/00* (2006.01)
*G09G 3/20* (2006.01)
*G09G 3/3233* (2016.01)

(52) U.S. Cl.
CPC ........... *G09G 3/006* (2013.01); *G09G 3/2096* (2013.01); *G09G 3/3233* (2013.01); *G09G 2300/0842* (2013.01); *G09G 2310/08* (2013.01); *G09G 2320/046* (2013.01); *G09G 2330/028* (2013.01); *G09G 2330/12* (2013.01)

(58) Field of Classification Search
CPC .... G09G 3/006; G09G 3/2096; G09G 3/3233; G09G 2300/0842; G09G 2310/08; G09G 2320/046; G09G 2330/028; G09G 2330/10; G09G 2330/12
See application file for complete search history.

(56) References Cited

U.S. PATENT DOCUMENTS

| | | | | |
|---|---|---|---|---|
| 11,367,407 | B2 * | 6/2022 | Ishii | G09G 3/3696 |
| 11,521,562 | B2 * | 12/2022 | Kim | G09G 3/3291 |
| 11,527,210 | B2 * | 12/2022 | Jang | G09G 3/3291 |
| 11,562,700 | B2 * | 1/2023 | Lee | G09G 3/3233 |
| 11,587,481 | B2 * | 2/2023 | Kwon | G09G 3/20 |
| 11,626,072 | B2 * | 4/2023 | Hong | G09G 3/3266 345/76 |
| 11,783,784 | B2 * | 10/2023 | Lee | G09G 3/3266 345/204 |
| 11,961,452 | B2 * | 4/2024 | Park | G09G 3/3233 |
| 2018/0061293 | A1 | 3/2018 | Park | |
| 2021/0065639 | A1 * | 3/2021 | Ishii | G09G 3/3696 |
| 2021/0407437 | A1 * | 12/2021 | Jang | G09G 3/3233 |

(Continued)

FOREIGN PATENT DOCUMENTS

| | | |
|---|---|---|
| KR | 20170076952 A | 7/2017 |
| KR | 20190078780 A | 7/2019 |
| KR | 20220051550 A | 4/2022 |

*Primary Examiner* — Michael Pervan
(74) *Attorney, Agent, or Firm* — Seed Intellectual Property Law Group LLP

(57) ABSTRACT

Embodiments relate to display devices and driving methods thereof. A display device includes a display panel including a sub-pixel arranged thereon and configured to display an image, a power controller configured to supply a reference voltage to the sub-pixel, a sensing circuit configured to sense a voltage of the sub-pixel during a blank time within a frame during the display driving of the image, and a timing controller configured to detect a defect of the display panel based on the voltage sensed during the display driving.

20 Claims, 11 Drawing Sheets

(56) References Cited

U.S. PATENT DOCUMENTS

| | | | | |
|---|---|---|---|---|
| 2022/0157261 | A1* | 5/2022 | Kim | G09G 3/3233 |
| 2022/0172683 | A1* | 6/2022 | Lee | G09G 3/3266 |
| 2022/0199025 | A1* | 6/2022 | Hong | G09G 3/3258 |
| 2022/0199039 | A1* | 6/2022 | Lee | G09G 3/3266 |
| 2022/0208045 | A1* | 6/2022 | Kwon | G09G 3/006 |
| 2023/0410719 | A1* | 12/2023 | Park | G09G 3/3233 |

* cited by examiner

DISPLAY DEVICE AND DRIVING METHOD THEREOF

CROSS REFERENCE TO RELATED APPLICATION

The present application claims priority to Korean Patent Application No. 10-2023-0011928, filed on Jan. 30, 2023, the entire contents of which is incorporated herein for all purposes by this reference.

BACKGROUND

Technical Field

The present disclosure relates to a display device and driving method thereof.

Description of the Related Art

Recently, display devices utilizing self-emitting organic light-emitting diodes (OLEDs) have been gaining attention due to their advantages such as fast response time, high luminous efficiency, brightness, and wide viewing angles.

These display devices array sub-pixels, including organic light-emitting diodes (OLEDs) and driving transistors, in a matrix format on the display panel and control the brightness of sub-pixels selected through scan signals based on gradation of data.

These display devices have various signal lines and signal transmission structures to facilitate their operation.

When defects such as open or short circuits in signal lines, as well as issues with the connection and bonding of signal transmission structures, occur, these display devices may experience the panel burnt phenomenon, which is characterized by abnormal operation and damage to the display panel. Ultimately, the display devices encounter severe defects, and in extreme cases, even lead to fires.

Therefore, defects that lead to the panel burnt phenomenon are detected proactively before the occurrence of the panel burnt phenomenon. In addition, accurate identification and efficient management of the detected defects that can cause panel burnt phenomenon is performed. Through such management, immediate and appropriate measures can be taken in response to the occurrence of defects.

BRIEF SUMMARY

Embodiments provide a display device and driving method thereof that are capable of detecting defects such as panel burnt during the display driving of an image.

Embodiments provide display devices and a driving method thereof that are capable of reducing the processing time of real-time sensing processes.

Embodiments provide a display device and driving method thereof that are capable of improving panel burnt detection accuracy by directly detecting the burnt phenomenon through reference voltage lines inside the sub-pixels during display driving.

A display device according to an embodiment may include a display panel comprising a sub-pixel arranged thereon and configured to display an image, a power controller configured to supply a reference voltage to the sub-pixel, a sensing circuit configured to sense a voltage of the sub-pixel during a blank time within a frame during display driving of the image, and a timing controller configured to detect a defect of the display panel based on the voltage sensed during the display driving.

The sensing circuit may acquire a first sensing voltage through first sensing during a first detection period during which the reference voltage is supplied to the sub-pixel, and may acquire a second sensing voltage through second sensing during a second detection period during which the supply of the reference voltage is interrupted.

The display device may further include a first switch configured to control a connection between the power controller and a reference voltage line of the sub-pixel and a second switch configured to control the connection between the reference voltage line and the sensing circuit.

The first switch may be turned on, during the first detection period, to supply the reference voltage to the reference voltage line while the second switch is turned on to sense the voltage fed back in response to the reference voltage in the reference voltage line, and turned off, during the second detection period, while the second switch turns on to sense the voltage charged in the reference voltage line.

The timing controller may determine the defect based on a difference between the reference voltage and the first sensing voltage being equal to or greater than a first threshold value and based on a difference between the first sensing voltage and the second sensing voltage being equal to or greater than a second threshold value.

The sensing circuit may perform the second sensing for part of a plurality of sub-pixels a plurality of times, and the timing controller may make a final defect determination for the part based on the number of defect determinations that result from the second sensing being greater than a predetermined or selected value.

The timing controller may control sensing of the sub-pixel according to a first mode or a second mode. The first mode includes sensing a characteristic value of a component included in the sub-pixel, and the second mode includes sensing a defect of the display panel through the first sensing and the second sensing.

The sub-pixel may include an organic light emitting diode, a driving transistor configured to control driving current applied to the organic light emitting diode, a switching transistor configured to transfer data voltage to the driving transistor, and a sensing transistor configured to control the connection between a reference voltage line applied with the reference voltage and the driving transistor.

The switching transistor and the sensing transistor may be turned off during the blank time.

The power controller may apply a display reference voltage to the reference voltage line during an active time within the frame and apply a sensing reference voltage different in voltage level from the display reference voltage to the reference voltage line during the blank time.

The sensing reference voltage may be higher in voltage level than the display reference voltage.

A driving method of a display device according to an embodiment drives with a frame including an active time for displaying an image and a blank time following the active time.

The method may include: performing primary detection of a defect of a display panel by supplying a reference voltage to a sub-pixel during the blank time and performing first sensing of the voltage of the sub-pixel during the supply of the reference voltage; and performing secondary detection of the defect of the display panel by stopping the supply of the reference voltage and performing second sensing of the voltage of the sub-pixel.

The primary detection may include interrupting application of a scan signal and a sensing signal for the sub-pixel, supplying the reference voltage to the sub-pixel, and sensing the voltage fed back in response to the reference voltage in the reference voltage line of the sub-pixel.

The secondary detection may include interrupting the supply of the reference voltage and sensing the voltage charged in the reference voltage line.

The primary detection may include comparing the difference between a first sensing voltage acquired through the sensing and the reference voltage with a first threshold value and determining a defect based on the difference between the first sensing voltage and the reference voltage being equal to or greater than the first threshold value. The secondary detection may include comparing the difference between a second sensing voltage acquired through the secondary-sensing and the first voltage with a second threshold value and determining a defect based on the difference between the second sensing voltage and the first sensing voltage being equal to or greater than the second threshold value.

The display device may include a first switch configured to control a connection between a power controller outputting the reference voltage and a reference voltage line of the sub-pixel and a second switch configured to control a connection between the reference voltage line and a sensing circuit for sensing the voltage of the sub-pixel. The primary detection may include turning on the first switch and turning on the second switch during the turn-on of the first switch. The secondary detection may include turning off the first switch and turning on the second switch.

The secondary detection may be performed a plurality of times to make a final determination of a defect of the sub-pixel based on the number of defect determinations resulting from the secondary detection being equal to or greater than a predetermined or selected value.

The method may further include sensing a characteristic value of a circuit component included in the sub-pixel during the blank time according to a sensing mode.

The method may further include applying a display reference voltage different in voltage level from the reference voltage to the sub-pixel during the active time.

A display device and driving method thereof according to embodiments are capable of reducing burnt defect detection time and the blanking periods by detecting burnt defects of the display panel during the display driving of images.

A display device and driving method thereof according to embodiments are capable of increasing the driving frequencies of the display by reducing the blanking period in a frame, allowing for the fast operation of high-luminance display devices.

A display device and driving method thereof according to embodiments are capable of improving detection accuracy by directly supplying reference voltage to the reference voltage lines and using the reference voltage lines to detect burnt defects.

A display device and driving method thereof according to embodiments are capable of detecting burnt defects in real time during display operation, allowing for quick response and preventing additional damage.

DETAILED DESCRIPTION

Figure 1:
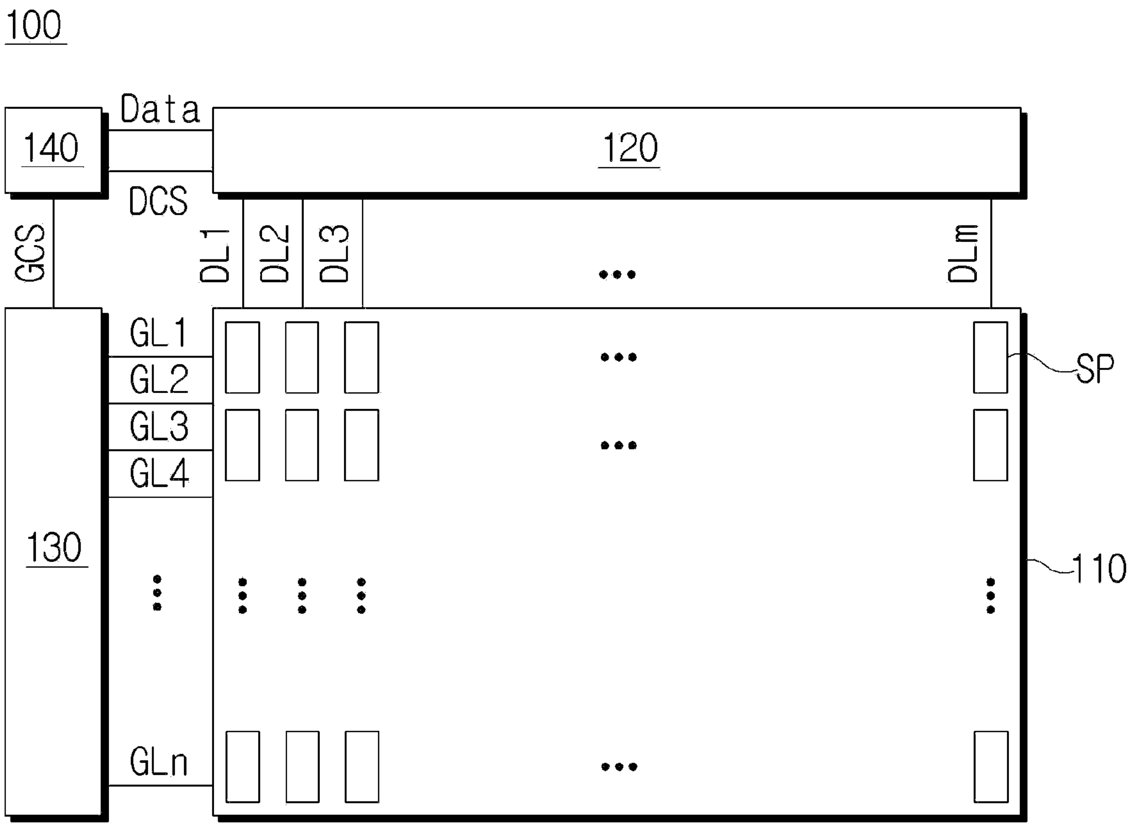
FIG. 1 is a diagram illustrating a system configuration of a display device according to an embodiment.

Hereinafter, embodiments will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that can include associated components.

The terms "first," "second," etc., are used to describe various components, but the components should not be limited by these terms. The terms are used only for distinguishing one component from another component. For example, a first component may be referred to as a second component and, similarly, the second component may be referred to as the first component, without departing from the scope of the present disclosure. As used herein, the singular forms are intended to include the plural forms as well, unless the context clearly indicates otherwise.

The terms such as "below," "lower," "above," "upper," etc., are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a diagram illustrating a system configuration of a display device 100 according to an embodiment.

With reference to FIG. 1, the display device 100 according to an embodiment includes a display panel 110 in which a plurality of sub-pixels SP defined by, or positioned at regions of overlap of, a plurality of data lines DL1 to DLm and a plurality of gate lines GL1 to GLn arranged thereon in the form of a matrix, a data driver 120 driving the plurality of data lines DL1 to DLm, a gate driver 130 driving the plurality of gate lines GL1 to GLn, and a timing controller 140 controlling the data driver 120 and gate driver 130.

The timing controller 140 supplies various control signals to the data driver 120 and gate driver 130 to control the data driver 120 and gate driver 130.

The timing controller 140 determines the timing for initiating scanning in each frame, converts the input video data received from external sources into the data signal format used by the data driver 120, outputs the converted video data, and controls the data driving at appropriate times synchronized with the scanning process.

The data driver 120 drives the plurality of data lines DL1 to DLm by supplying data voltages to the plurality of data lines DL1 to DLm. The data driver 120 is also referred to as the "source driver." The data driver 120 may include at least one source driver integrated circuit SDIC to drive the plurality of data lines DL1 to DLm.

The gate driver 130 sequentially supplies scanning signals to the plurality of gate lines GL1 to GLn, thereby sequentially driving the gate lines. The gate driver 130 is also known as the "scan driver." The gate driver 130 may include at least one gate driver integrated circuit GDIC to drive the plurality of gate lines GL1 to GLn.

Under the control of the timing controller 140, the gate driver 130 supplies scanning signals of on or off voltages to the plurality of gate lines GL1 to GLn in a sequential manner.

When a specific gate line is opened by the gate driver 130, the data driver 120 converts the received video data, which is in digital form, into analog data voltages and supplies the analog data voltages to the plurality of data lines DL1 to DLm.

Although the data driver 120 is positioned on only one side (e.g., top or bottom of the display panel 110) in FIG. 1, it may also be positioned on both sides (e.g., top and bottom) of the display panel 110, depending on the driving method and panel design.

Although the gate driver 130 is positioned on only one side (e.g., left or right) of the display panel 110 in FIG. 1, it may also be positioned on both sides (e.g., left and right) of the display panel 110 depending on the driving method and panel design.

The timing controller 140 receives various timing signals including vertical synchronization signals, horizontal synchronization signals, input data enable signals, and clock signals from an external source (e.g., host system), along with input video data.

To control the data driver 120 and gate driver 130, the timing controller 140 generates various control signals based on the timing signals such as vertical sync signals, horizontal sync signals, input data enable (DE) signals, and clock signals, and outputs the generated signals to the data driver 120 and gate driver 130.

For example, the timing controller 140 outputs various gate control signals GCS including gate start pulse, gate shift clock, and gate output enable signals to control the gate driver 130.

The timing controller 140 also outputs various data control signals DCS including source start pulse, source sampling clock, and source output enable signals to control the data driver 120.

Each sub-pixel SP arranged on the display panel 110 may be composed of circuit components such as transistors. For example, each sub-pixel SP may be composed of circuit components such as an organic light-emitting diode OLED and a driving transistor for driving the organic light-emitting diode OLED. The types and quantities of circuit components constituting each sub-pixel SP may vary depending on the desired functions and design approach.

Figure 2:
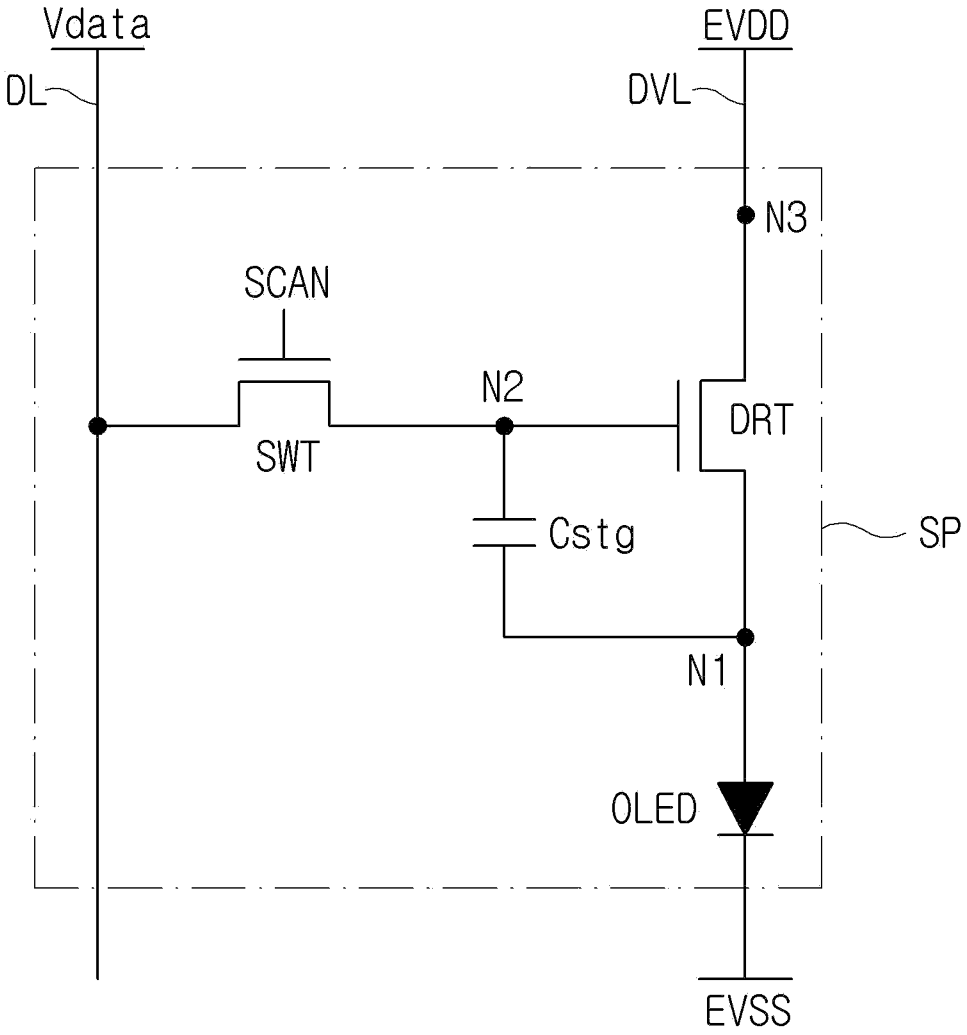
FIG. 2 is a schematic diagram illustrating a sub-pixel of a display device according to an embodiment.

FIG. 2 is a schematic diagram illustrating a configuration of a sub-pixel SP of a display device 100 according to an embodiment.

With reference to FIG. 2, each sub-pixel of the display device 100 according to an embodiment may be configured to essentially include an organic light-emitting diode OLED, a driving transistor DRT that controls driving current applied to the organic light-emitting diode OLED, a switching transistor SWT that transfers data voltage to the gate node of the driving transistor DRT, and a storage capacitor Cstg that maintains the data voltage corresponding to the video signal voltage or the corresponding voltage for one frame duration.

The organic light-emitting diode OLED may include a first electrode (e.g., anode electrode), an organic layer, and a second electrode (e.g., cathode electrode).

The driving transistor DRT drives the organic light-emitting diode OLED by supplying driving current to the organic light-emitting diode OLED. The first node N1 of the driving transistor DRT may be electrically connected to the first electrode of the organic light-emitting diode OLED and may be the source node or the drain node. The second node N2 may be electrically connected to the source node or the drain node of the switching transistor SWT and may be the gate node. The third node N3 may be electrically connected to the driving power line DVL supplying a high-potential driving voltage EVDD and may be the drain node or the source node.

The switching transistor SWT is electrically connected between the data line DL and the second node N2 of the driving transistor DRT and may be controlled by a scan signal SCAN applied with at the gate node thereof. The switching transistor SWT is turned on by the scan signal SCAN and may transmit the data voltage Vdata supplied through the data line DL to the second node N2 of the driving transistor DRT.

The storage capacitor Cst may be electrically connected between the first node N1 and the second node N2 of the driving transistor DRT. The storage capacitor Cstg is an external capacitor intentionally designed outside the driving transistor DRT rather than a parasitic capacitor as an internal capacitor existing between the first node N1 and the second node N2 of the driving transistor DRT.

Meanwhile, in a display device 100 according to an embodiment, as the drive time of the sub-pixel SP increases, the circuit components such as organic light-emitting diodes OLED and the driving transistor DRT may degrade. As a result, the intrinsic characteristic values of the circuit components may change. These characteristic values may include the threshold voltage and mobility of the driving transistor DRT and the threshold voltage of the organic light-emitting diode OLED. Such changes in the characteristic values of the circuit components lead to variations in luminance of the corresponding sub-pixels, causing a decrease in the uniformity of brightness in the display panel 110 and deteriorating image quality.

The display device 100 according to an embodiment may provide sensing functionality to sense the characteristic values or changes in the characteristic values of the circuit components and compensation functionality to compensate for the characteristic value deviations between circuit components based on the sensing results.

Figure 3:
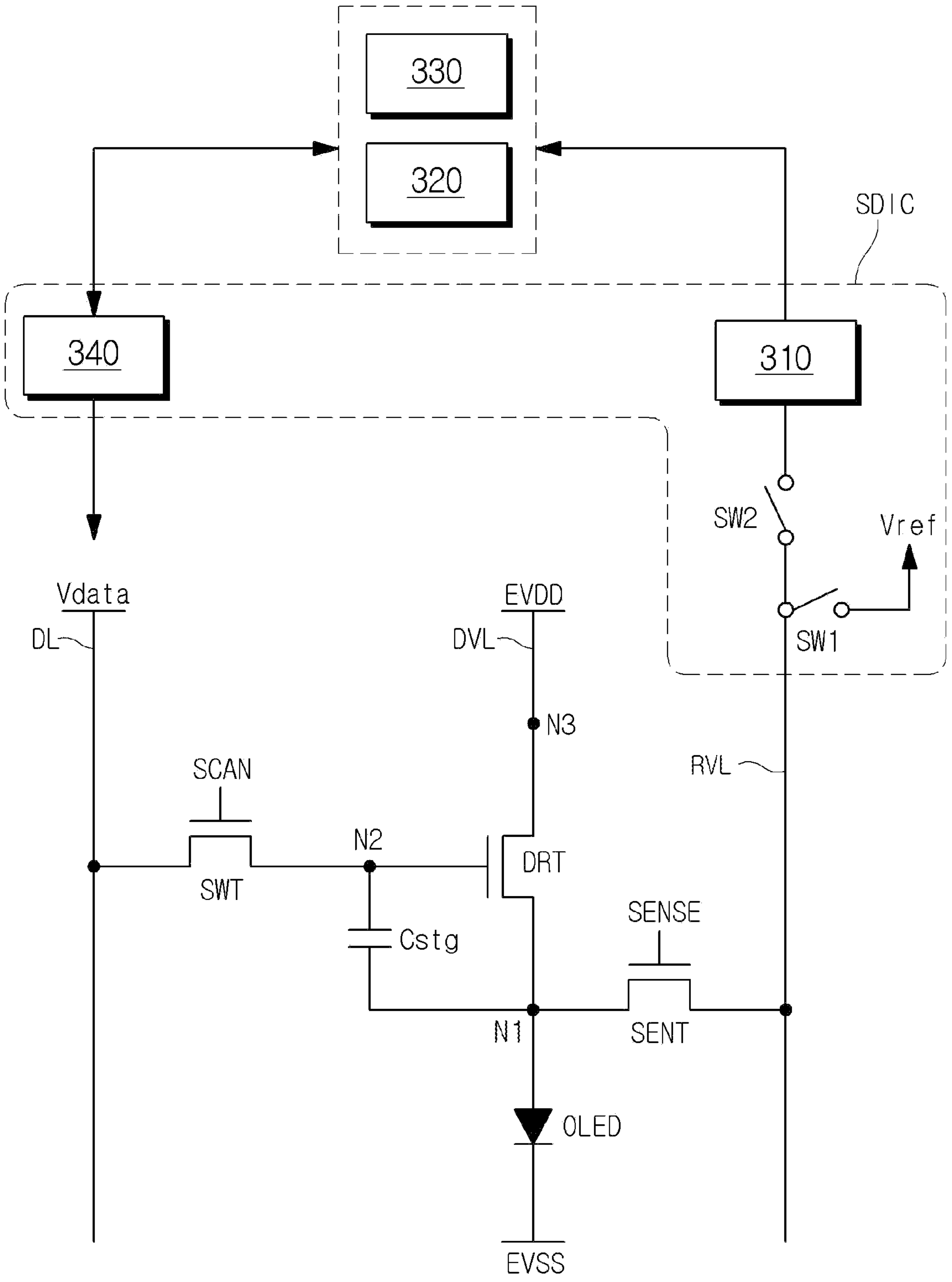
FIG. 3 is a schematic diagram illustrating a sub-pixel configuration and compensation circuity of a display device according to another embodiment.

FIG. 3 is a schematic diagram illustrating a configuration of a sub-pixel and compensation circuitry of the display device 100 according to an embodiment.

With reference to FIG. 3, each sub-pixel arranged in the display panel 110 according to an embodiment may further include a sensing transistor SENT in addition to the organic light-emitting diode OLED, the driving transistor DRT, the switching transistor SWT, and the storage capacitor Cstg.

The sensing transistor SENT is electrically connected between the first node N1 of the driving transistor DRT and a reference voltage line RVL that supplies a reference voltage Vprer and may be controlled by a sensing signal SENSE, which is a type of scan signal, applied to the gate node. The sensing transistor SENT turns on in response to the sensing signal SENSE and applies the reference voltage Vprer, which is supplied through the reference voltage line RVL, to the second node N1 of the driving transistor DRT. The sensing transistor SENT may also serve as one of the voltage sensing paths for the first node N1 of the driving transistor DRT.

Meanwhile, the scan signal SCAN and the sensing signal SENSE may be separate gate signals. In this case, the scan signal SCAN and the sensing signal SENSE may be applied to the gate nodes of the switching transistor SWT and the sensing transistor SENT, respectively, through different gate lines. In another embodiment, the scan signal SCAN and the sensing signal SENSE may be the same gate signal. In this case, the scan signal SCAN and the sensing signal SENSE may be commonly applied to the gate nodes of both the switching transistor SWT and the sensing transistor SENT through the same gate line.

The driving transistor DRT, the switching transistor SWT, and the sensing transistor SENT may each be implemented as an n-type or p-type transistors With reference to FIG. 3, the display device 100 according to an embodiment may include a sensing unit or circuit 310 for sensing electrical signals (voltages) reflecting sub-pixel characteristic values (characteristic values of the driving transistor and organic light-emitting diode) or changes in the sub-pixel characteristic values, converting the sensed electrical signals to digital values, and outputting the digital values as sensing data, a memory 320 for storing the sensing data Vsen, and a compensation unit or circuit 330 for performing compensation processes to compensate the sub-pixel characteristic values or characteristic value deviations based on the sensing data.

The sensing unit 310 may be implemented to include at least one analog-to-digital converter. The at least one analog-to-digital converter may be included within the source driver integrated circuit SDIC or positioned outside the source driver integrated circuit SDIC, depending on the case. The sensing data output from the sensing unit 310 may have a low voltage differential signaling (LVDS) data format as an example.

The compensation unit 330 may be included internally or externally to the timing controller 140 depending on the case.

A display device 100 according to an embodiment may include a first switch SW1 that controls the supply of the reference voltage Vprer to a reference voltage line RVL for controlling the sensing operation, and a second switch SW2 that switches the connection between the reference voltage line RVL and the sensing unit 310.

The first switch SW1 controls the connection between a power controller and the reference voltage line RVL. When the first switch SW1 is turned on, the reference voltage Vprer is supplied to the reference voltage line RVL. The reference voltage Vprer supplied to the reference voltage line RVL may be applied to the first node N1 of the driving transistor DRT through the turned-on sensing transistor SENT.

Meanwhile, when the voltage at the first node N1 of the driving transistor DRT becomes a voltage state reflecting a sub-pixel characteristic value, the voltage in the reference voltage line RVL, which is equipotential to the first node N1 of the driving transistor DRT, may also become the voltage state reflecting the sub-pixel characteristic value. Here, the voltage reflecting the sub-pixel characteristic value may be charged to the line capacitor formed on the reference voltage line RVL. That is, when the sensing transistor SENT is turned on, the voltage at the first node N1 of the driving transistor DRT may be the same as the voltage of the reference voltage line, i.e., the voltage charged to the line capacitor formed on the reference voltage line RVL.

When the voltage at the first node N1 of the driving transistor DRT becomes a voltage state reflecting the sub-pixel characteristic value, the second switch SW2 is turned on, allowing the connection between the sensing unit 310 and the reference voltage line RVL. Consequently, the sensing unit 310 senses the voltage in the reference voltage line RVL, which reflects the sub-pixel characteristic value. Here, the reference voltage line RVL is also referred to as the sensing line. That is, the sensing unit 310 senses the voltage at the first node N1 of the driving transistor DRT.

This reference voltage line RVL may be arranged per sub-pixel column or per two or more sub-pixel columns. For example, in the case where one pixel consists of four sub-pixels (red sub-pixel, white sub-pixel, green sub-pixel, blue sub-pixel), the reference voltage line RVL may be arranged with one line per pixel column containing four sub-pixel columns (red sub-pixel column, white sub-pixel column, green sub-pixel column, blue sub-pixel column).

In the case of sensing the threshold voltage of the driving transistor DRT, the voltage sensed by the sensing unit 310 may be a voltage value (Vdata-Vth or Vdata-ΔVth) including the threshold voltage (Vth) or threshold voltage variation (ΔVth) of the driving transistor DRT. Meanwhile, in the case of sensing the mobility of the driving transistor DRT, the voltage sensed by the sensing unit 310 may be a voltage value representing the mobility of the driving transistor DRT.

The sensing unit 310 converts the sensed voltage into a digital value and generates and output the sensing data Vsen including the converted digital value (sensing value). The sensing data Vsen outputted from the sensing unit 310 may be stored in the memory 320 or provided to the compensation unit 330.

The compensation unit 330 may based on the sensing data stored in the memory 320 or provided by the sensing unit 310, check the characteristic values (e.g., threshold voltage and mobility) of the driving transistors DRT within the corresponding sub-pixel or changes in the characteristic values of the driving transistors DRT (e.g., changes in threshold voltage and mobility) and reflect the characteristic values or changes in the characteristic values to the compensation process.

Here, the changes in characteristic values of the driving transistor DRT may refer to the change in the current sensing data Vsen compared to the previous sensing data Vsen, or the change in the current sensing data Vsen compared to the reference compensation data.

By comparing the characteristic values or changes in the characteristic values between driving transistors DRT, the compensation unit 330 may determine the deviations in characteristic values among the driving transistors DRT.

When the changes in characteristic values of the driving transistor DRT refers to the change in the current sensing data compared to the reference sensing data, it is possible to determine the characteristic values deviations (i.e., sub-pixel luminance deviations) among the driving transistors DRT based on the changes in the characteristic values of the driving transistors DRT.

The characteristic value compensation process may include a threshold voltage compensation process for compensating the threshold voltage of the driving transistor DRT and a mobility compensation process for compensating the mobility of the driving transistor DRT. The compensation unit 330 may modify the video data Data through threshold voltage compensation or mobility compensation and supply the modified data to the corresponding source driver integrated circuit SDIC within the data driver 120. Consequently, the source driver integrated circuit SDIC converts the data modified by the compensation unit 330 into a data voltage via a digital-to-analog converter 340 and supplies the data voltage to the corresponding sub-pixel, allowing for actual compensation of sub-pixel characteristic values. The sub-pixel characteristic value compensation helps reduce or prevent luminance deviations among sub-pixels, leading to an improvement in the uniformity of luminance across the display panel 110 and the overall image quality.

Figure 4:
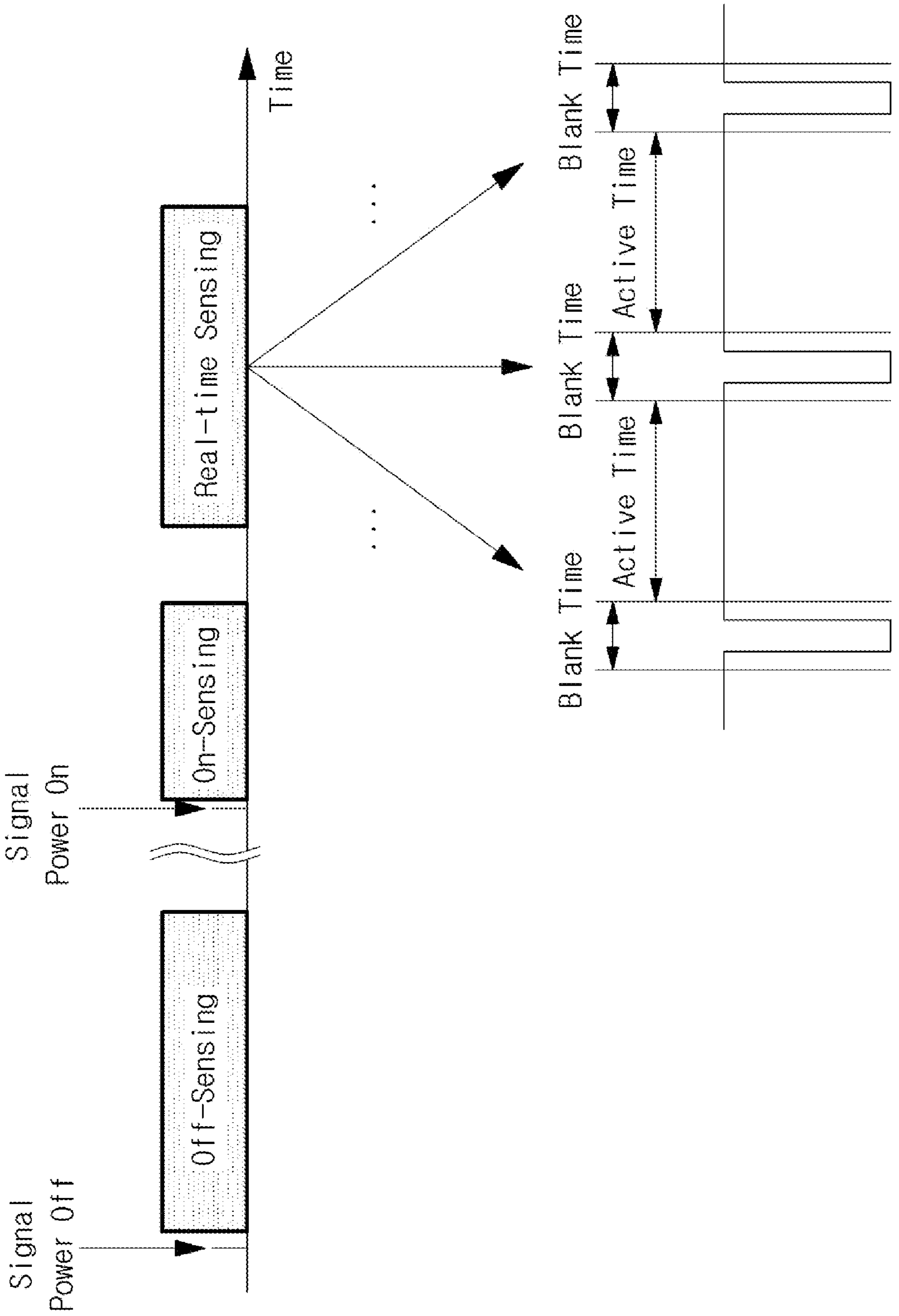
FIG. 4 is a diagram illustrating sensing timing of a display device according to an embodiment.
Figure 5:
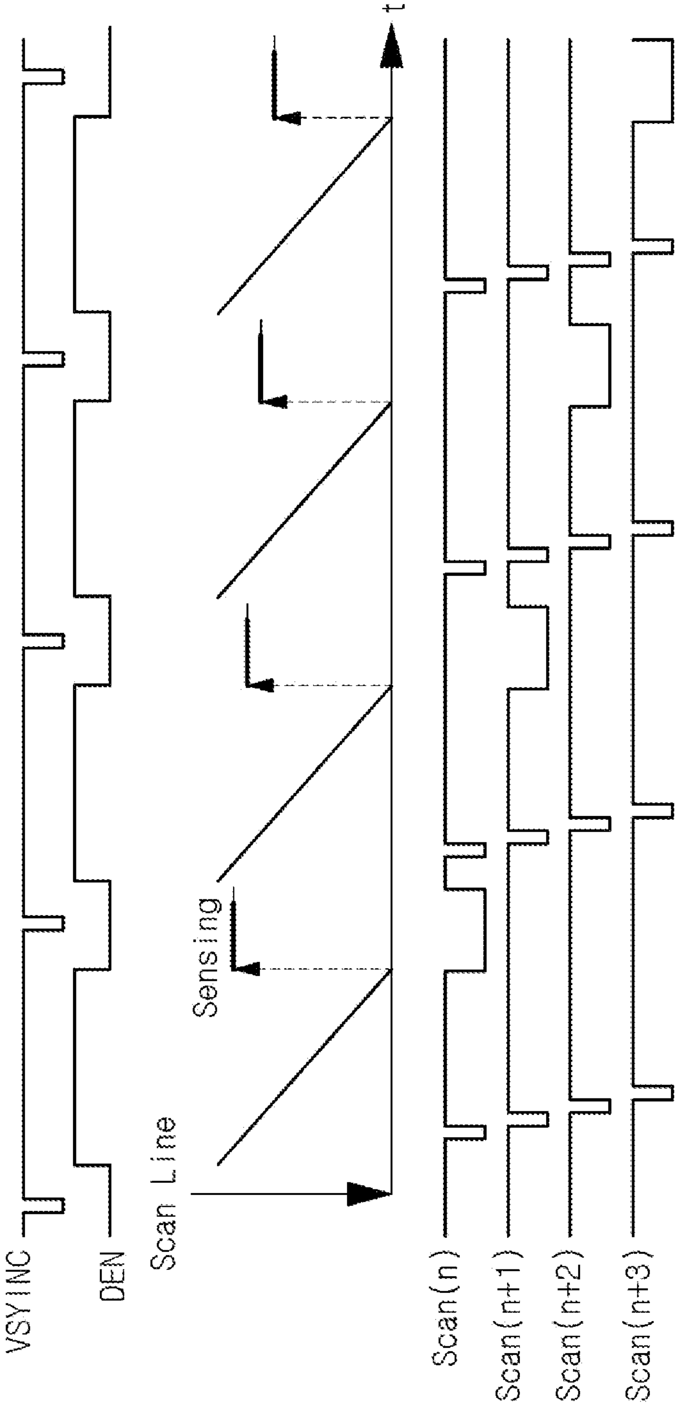
FIG. 5 is a diagram illustrating the operation of a real-time sensing process.

FIG. 4 is a diagram illustrating sensing timing of a display device 100 according to an embodiment, and FIG. 5 is a diagram illustrating the operation of a real-time sensing process.

With reference to FIG. 4, the display device 100 according to an embodiment may perform sensing the characteristic values of the circuit components within each of sub-pixels arranged on the display panel 110 upon detection of a power-off signal generated in response to a user input or the like. This sensing process that occurs after the power-off signal is called "off-sensing."

Meanwhile, the display device 100 according to an embodiment may perform sensing the characteristic values of circuit components within each sub-pixel upon detection of a power-on signal generated in response to a user input or the like but before the display driving (normal driving) begins. This sensing process that occurs after the power-on signal before the display driving is called "on-sensing."

Furthermore, the display device 100 according to an embodiment may perform sensing of the characteristic values of circuit components within each sub-pixel during the display driving. This sensing process that occurs during the display driving is referred to as "real-time sensing" or "RT sensing." The real-time sensing takes place at each blank time between active times, which is determined by the vertical sync signal.

Meanwhile, when one or more of the signal lines (DL, RVL, GL, and DVL) arranged on the display panel 110 are open or when two or more signal lines are shorted, the sensing values may be obtained abnormally. Accordingly, when the difference between the sensing values obtained through the sensing process described above and the reference sensing values (sensing value obtained when the signal lines are in a normal state) exceeds a predetermined or selected range, it is possible to determine that there is a defect on the signal lines.

As shown in FIG. 5, the real-time sensing may take place during the blank times between the active times activated by the data enable signal DEN within frames separated by the vertical synchronization signal Vsync. The active time refers to the period during which the data driver 120 outputs data voltage Vdata through a plurality of data lines DL1 to DLm, while the gate driver 130 sequentially drives a plurality gate lines GL1 to GLn.

In an embodiment, characteristic value sensing in the real-time sensing process may be performed for pixel lines connected to one or more selected gate lines, GL1 to GLn within a single blank time. Additionally, characteristic value sensing may be performed for specific color sub-pixels SP on one or more selected pixel lines within a single blank time. Throughout a plurality of blank times, characteristic value sensing may be sequentially performed for pixel lines.

As the display panel 110 undergoes high-brightness enhancement, the length of the active time for programming data voltage Vdata to sub-pixels SP may increase. With a given driving frequency, shorter blank times are beneficial as the length of the active time increases. There is therefore a need for a method to complete the real-time sensing process within a short period of time.

Figure 6:
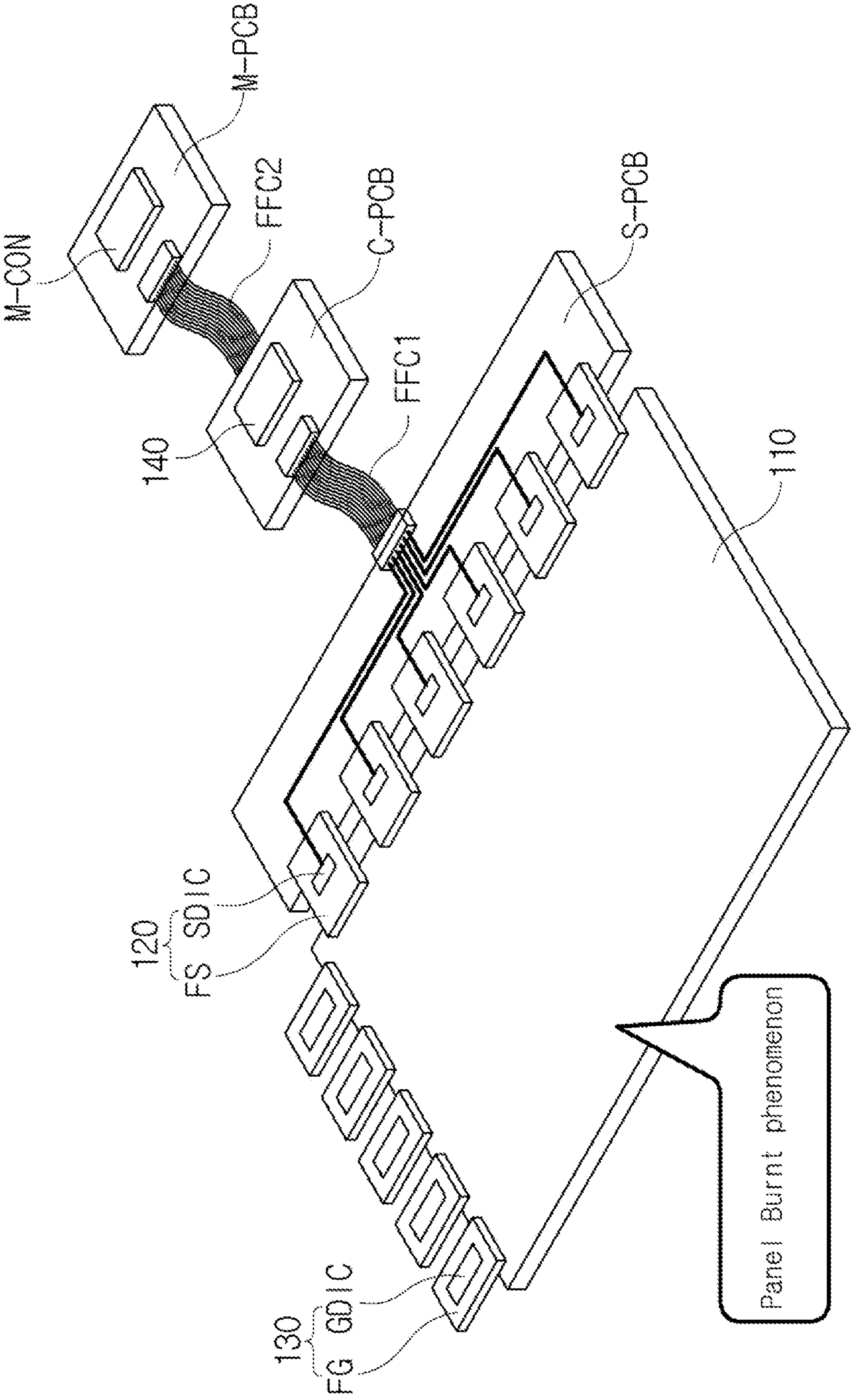
FIG. 6 is a diagram for explaining panel burnt phenomenon of a display device according to an embodiment.

FIG. 6 is a diagram for explaining panel burnt phenomenon in a display device 100 according to an embodiment.

With reference to FIG. 6, the data driver 120 may include at least one SDIC to drive a plurality of data lines DL1 to DLm.

Each source driver integrated circuit SDIC may be connected to the bonding pads of the display panel 110 using tape-automated-bonding or chip-on-glass techniques or directly placed on the display panel 110 or, in some cases, integrated within the display panel 110, depending on the specific configuration. Also, each source driver integrated circuit SDIC may be implemented using the chip-on-film (COF) method where it is mounted on the source-side film FS connected to the display panel 110, as shown in FIG. 6.

Each source driver integrated circuit SDIC may include components such as a shift register, a latch circuit, a digital-to-analog converter, and an output buffer. In some cases, each source driver integrated circuit SDIC may include an analog-to-digital converter.

The gate driver 130 may include at least one gate driver integrated circuit GDIC to drive a plurality of gate lines GL1 to GLn. Each gate driver integrated circuit GDIC may be connected to the bonding pad of the display panel 110 using tape-automated bonding or chip-on-glass techniques or directly placed on the display panel 110 by being implemented as gate-in-panel (GIP) type or, in some cases, integrated within the display panel 110. Furthermore, each gate driver integrated circuit GDIC may be implemented using the chip-on-film method where it is mounted on the gate-side film FG connected to the display panel 110, as shown in FIG. 6. Each gate driver integrated circuit GDIC may include components such as a shift register and a level shifter.

In an embodiment, the display device 100 may include at least one source printed circuit board S-PCB for the circuit connection of at least one source driver integrated circuit SDIC and a control printed circuit board C-PCB for mounting control components and various electrical devices. The at least one source printed circuit board S-PCB may accommodate at least one source driver integrated circuit SDIC or may be connected to the source-side film FS where at least one source driver integrated circuit SDIC is mounted. The control printed circuit board C-PCB may include a timing controller 140 controlling the operation of the data driver 120 and gate driver 130 and a power controller supplying various voltages or currents to the display panel 110, data driver 120, and gate driver 130 or controlling the supply of various voltages or currents. The at least one source printed circuit board S-PCB and the control printed circuit board C-PCB may be circuitally connected through at least one flexible flat cable FFC1.

The display device 100 may also include a main printed circuit board M-PCB accommodating a main controller M-CON and other components in addition to the at least one source printed circuit board S-PCB and the control printed circuit board C-PCB. The main printed circuit board M-PCB may be connected to the control printed circuit board C-PCB through at least one flexible flat cable FFC2. The at least one of the source printed circuit board S-PCB, the control printed circuit board C-PCB and the main printed circuit board M-PCB may be integrated into a single printed circuit board.

In an embodiment, the display panel 110 may experience panel burnt phenomena caused by various types of defects. The panel burnt phenomenon may occur due to various defects such as short or open circuits in the signal lines, DL, GL, DVL, RVL, gate voltage wiring, etc., located on the display panel 110, bonding errors between the display panel 110 and the gate-side film FG or source-side film FS, loose connection of the flexible flat cable FFC1 causing electrical connection issues between the source printed circuit board S-PCB and the control printed circuit board C-PCB, and loose connection of the flexible flat cable FFC2 causing electrical connection issues between the control printed circuit board C-PCB and the main printed circuit board M-PCB.

In the presence of such defects, the display panel 110 may experience panel burnt phenomenon and may not function properly. Moreover, the display device 100 may malfunction, and in extreme cases, even lead to fire incidents.

Therefore, it is beneficial to proactively detect the defects that lead to panel burnt phenomenon before the occurrence of panel burnt phenomenon. This facilitates prompt and suitable response measures in the event of a defect occurrence.

In an embodiment, burnt detection may be performed during the on-sensing process, off-sensing process, and/or real-time sensing process. For example, burnt detection may occur before or after the sensing of sub-pixel characteristic values as described earlier. In another embodiment, burnt detection may solely performed during the real-time sensing process, while the sensing of sub-pixel characteristic values may be skipped. In this case, the time used for burnt detection can be minimized or reduced, allowing for the implementation of very short blank times.

Hereinafter, a description is made of the method for detecting panel burnt during the sensing process in detail.

Figure 7:
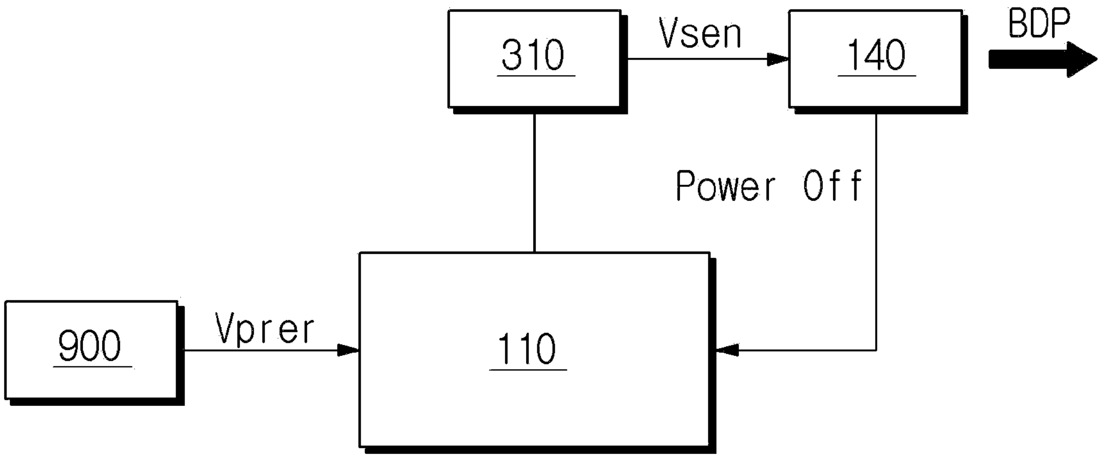
FIG. 7 is a connection relationship between a sensing unit, a timing controller and a power controller of a display device according to an embodiment.

FIG. 7 is a connection relationship between a sensing unit, a timing controller and a power controller of a display device according to an embodiment.

With reference to FIG. 7, a display device according to an embodiment includes a timing controller 140, a power controller 900, and a sensing unit 310.

The sensing unit 310 may perform panel sensing based on a control signal received from the timing controller 140. In an embodiment, the sensing unit 310 may be controlled to perform sensing according to either the first mode or the second mode during the real-time sensing process. In the first mode, the sensing unit 310 may sense characteristic values of a sub-pixel SP, such as threshold voltage and mobility. In the first mode, a scan signal SCAN, a sensing signal SENSE, and a sensing data voltage Vdata may be applied to the sub-pixels SP. In the second mode, the sensing unit 310 may perform sensing to detect defects such as panel burnt. In the second mode, the scan signal SCAN, sensing signal SENSE, and sensing data voltage Vdata may not be applied to the sub-pixels SP.

Since it takes time for the first node N1 within the sub-pixel SP to charge for sensing the characteristic value, a relatively longer blank time may be beneficial in the first mode. To reduce the blank time, the sensing of sub-pixel SP characteristic values may be skipped. In this case, the second mode may be performed for defect detection, such as panel burnt. A pattern detection method for minimizing or reducing the length of the blank time in the second mode is described with reference to FIGS. 8 to 10.

The timing controller 140 may detect sub-pixel SP characteristic values and/or panel defects based on the sensing data Vsen transmitted through the sensing unit 310. The timing controller 140 may also perform compensation processes to adjust the data voltage Vdata based on the sub-pixel SP characteristic values.

When a defect is detected, the timing controller 140 may generate and output a burnt detection and protection signal (BDP). In an embodiment, the timing controller 140 may output the BDP to an external host system or the like.

The timing controller 140 may perform power-off processing based on the burnt detection result. For example, the timing controller 140 may perform power-off processing for the high-potential driving voltage EVDD for driving the organic light-emitting diode OLED. Through such power-off processing by the timing controller 140, it is possible prevent additional damage of the display panel 110.

The power controller 900 may apply driving voltage to the sub-pixel SP. The power controller 900 may also apply a reference voltage Vprer to the reference voltage line RVL of the sub-pixels SP. In this case, the power controller 900 may apply the reference voltage at the first level to the sub-pixel SP during the active time within one frame, and it may apply the reference voltage at the second level to the sub-pixel SP during the blank time. Here, the first level and the second level may be different voltage levels, and the reference voltage of the first level may be referred to as "display reference voltage," while the reference voltage of the second level may be referred to as "sensing reference voltage." Furthermore, the sensing reference voltage may be applied at a different level for the first mode sensing and the second mode sensing.

Figure 8:
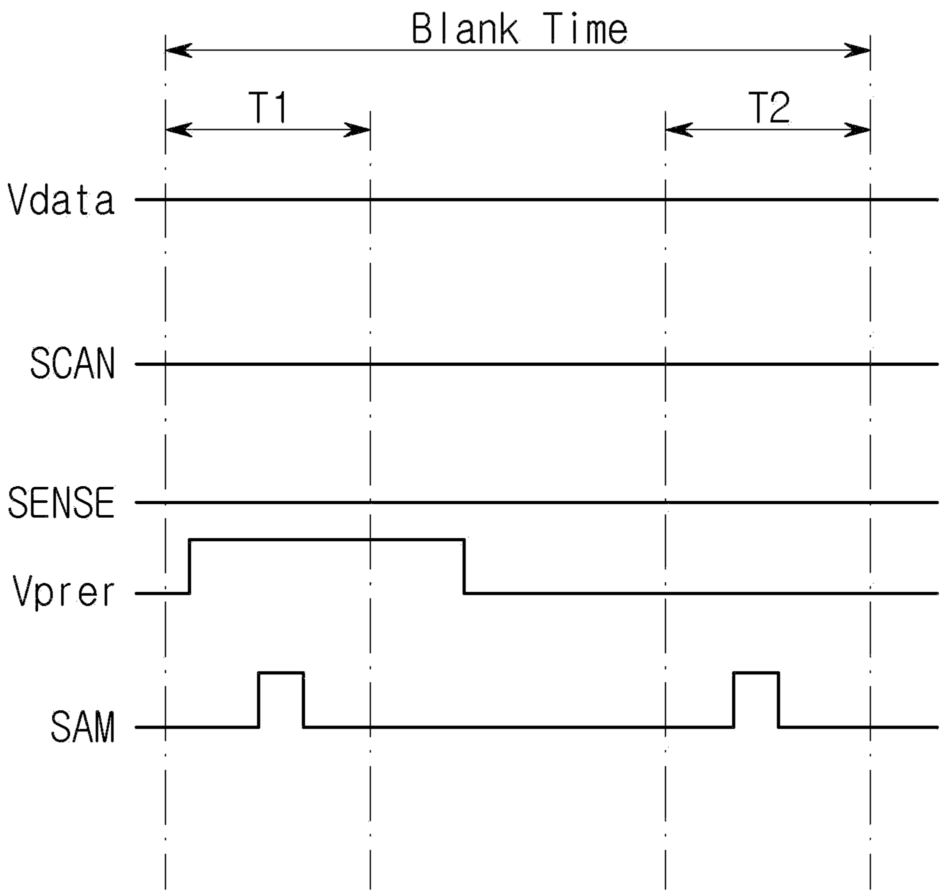
FIG. 8 is a diagram illustrating a burnt detection operation according to an embodiment.
Figure 9:
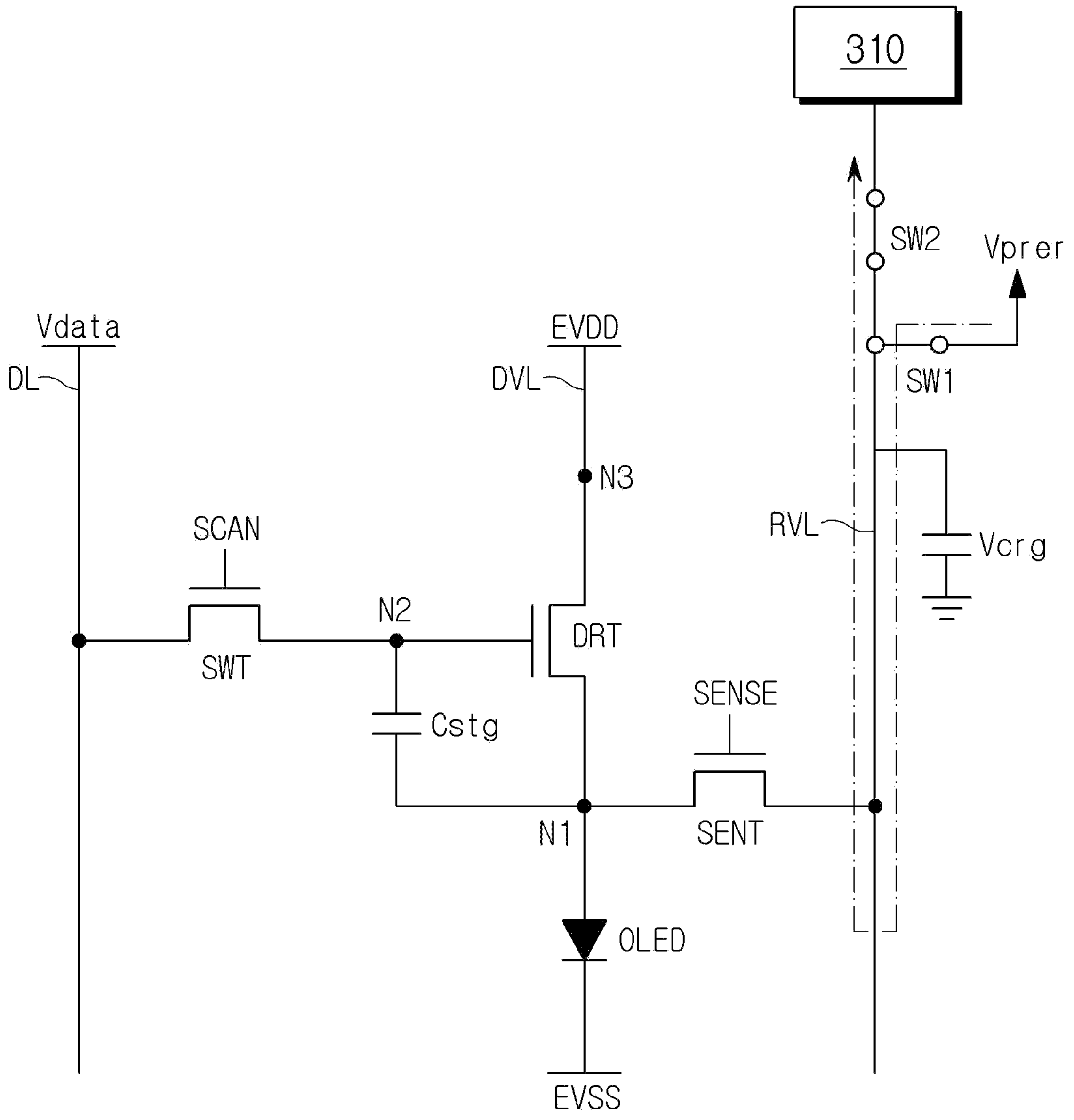
FIG. 9 is a diagram illustrating a driving state of a sub-pixel during a first detection period in FIG. 8.
Figure 10:
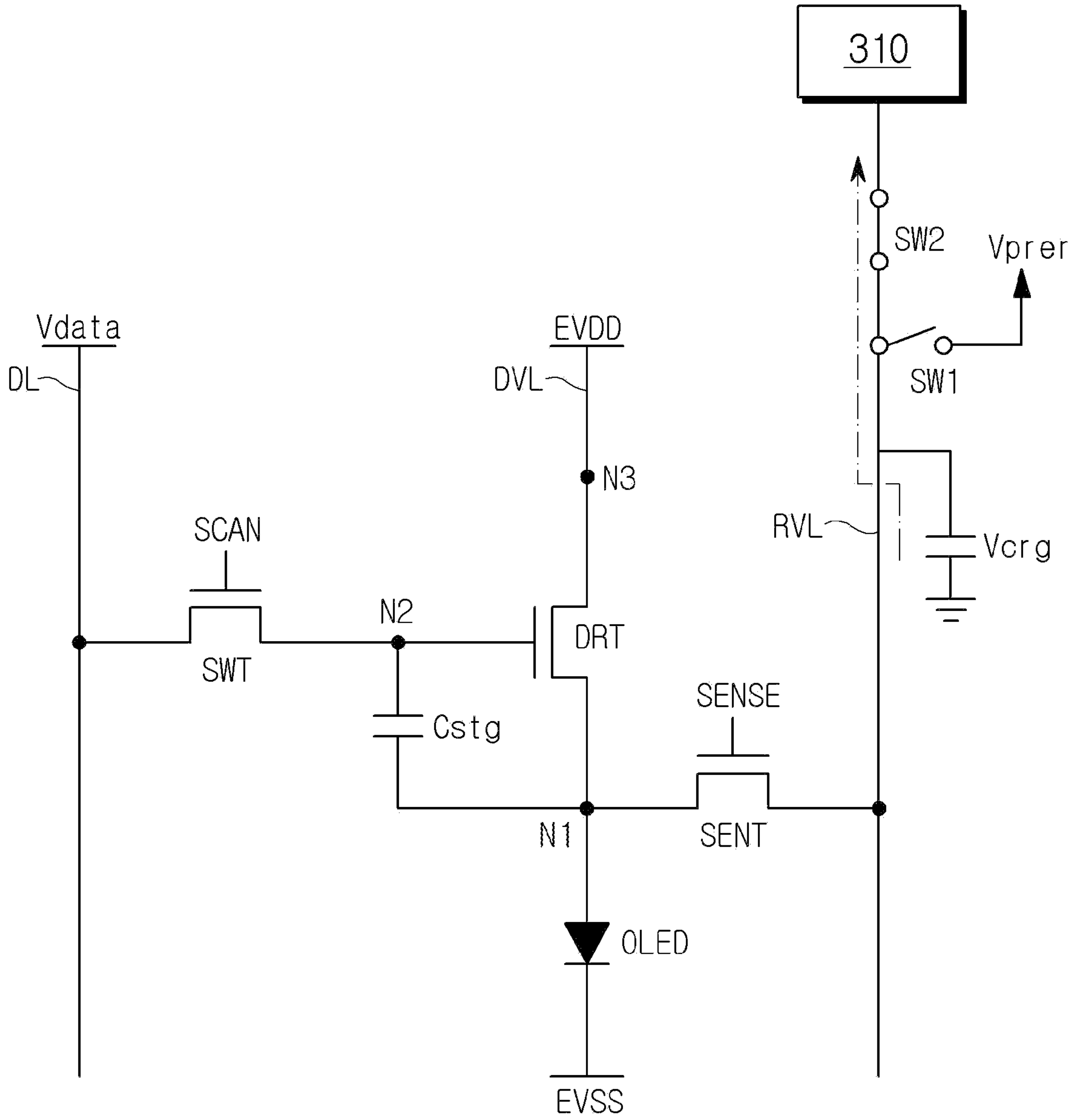
FIG. 10 is a diagram illustrating a driving state of a sub-pixel during a second detection period in FIG. 8.

FIG. 8 is a diagram illustrating a burnt detection operation according to an embodiment. FIG. 9 is a diagram illustrating a driving state of a sub-pixel during a first detection period in FIG. 8. FIG. 10 is a diagram illustrating a driving state of a sub-pixel during a second detection period in FIG. 8.

With reference to FIG. 8, the data voltage Vdata is not applied to the sub pixel SP during the blank time within one frame. Furthermore, during the blank time, the scan signal SCAN and the sensing signal SENSE are not applied to the sub pixel SP. Then, during the blank time, the switching transistor SWT and the sensing transistor SENT within the sub-pixel SP are turned off, and the reference voltage line RVL may be disconnected from the circuit components of the sub-pixel SP.

The blank time may include the first detection period (T1, first detection phase) and the second detection period (T2, second detection phase).

The first detection period T1 is a period for sensing the reference voltage Vprer output via the reference voltage line RVL. With reference to FIG. 9, during the first detection period T1, the first switch SW1 is turned on, and the reference voltage Vprer (e.g., sensing reference voltage) is applied to the reference voltage line RVL.

Here, the magnitude of the reference voltage Vprer is not particularly limited. However, the reference voltage Vprer may be set to a sufficiently high level to detect any leakage that may occur during the subsequent second detection period T2. For this purpose, the second level of the reference voltage Vprer in the real-time sensing processor may be higher than the first level of the reference voltage Vprer provided during the display driving in the active time, e.g., it may be around 5V or higher, but not limited thereto.

During the application of the reference voltage Vprer, the second switch SW2 is turned on at least once in response to the sampling signal SAM. As a result, the voltage of the reference voltage line RVL, which is fed back in response to the reference voltage Vprer, may be sensed through the sensing unit 310. In an embodiment, the turn-on duration of the second switch SW2 may be approximately 1 μs, but is not limited thereto.

When there is no defect such as burnt in the sub-pixel SP, the reference voltage Vprer applied to the reference voltage line RVL and the sensing voltage (referred to as the first sensing voltage) of the reference voltage line RVL may be practically the same magnitude. On the other hand, when burnt occurs in the sub-pixel SP, current may leak from the reference voltage line RVL, causing the first sensing voltage to be lower than the applied reference voltage Vprer.

The sensing unit 310 converts the first sensing voltage into sensing data Vsen, and provides it to the timing controller 140, which may detect burnt based on the sensing data Vsen. For example, the timing controller 140 may determine that burnt has occurred in the sub-pixel SP when the difference between the reference voltage Vprer and the first sensing voltage exceeds a predetermined or selected first threshold value.

When performing real-time sensing on a pixel line basis during one blank time, the timing controller 140 may determine that burnt has occurred in the pixel row when the average value of the first sensing voltage measured in one pixel line is equal to or greater than the predetermined or selected first threshold value. Alternatively, the timing controller 140 may make a final burnt determination for the pixel line when the number of sub-pixels SP determined to have burnt within one pixel line exceeds a predetermined or selected threshold value.

Meanwhile, when the reference voltage Vprer is applied for a sufficient period during the first detection period T1, the reference voltage line RVL may be charged with the reference voltage Vprer (Vchg) as shown in FIG. 10. Afterward, when the supply of the reference voltage Vprer is interrupted, the reference voltage line RVL becomes floating. The supply being interrupted includes the meaning that the reference voltage Vprer is not supplied to the reference voltage line RVL, such as due to the first switch being open. It should be understood that "floating" includes the meaning of being short-circuited to, e.g., a power supply node through the sub-pixel that has a burnt defect while being electrically isolated from the power controller 900. Namely, the reference voltage line RVL may be floating as concerns the power controller 900 due to the first switch being open.

Here, when there is no defect in the reference voltage line RVL, the charged voltage Vchg should be maintained. However, when a burnt defect such as a short occurs in the reference voltage line RVL, the voltage Vchg charged to the reference voltage line RVL may decrease due to leakage. For example, when the reference voltage Vprer of approximately 5V is applied during the first detection period T1, the charged voltage Vchg in the reference voltage line RVL having a defect may decrease due to leakage, reaching around 1 to 2 V.

In order to detect such short defects, the blank time may include an additional second detection period T2. The second detection period T2 is a period for sensing the charged voltage Vchg of the reference voltage line RVL in the floating state.

During the second detection period T2, the second switch SW2 may be turned on at least once in response to the sampling signal SAM. As a result, the voltage charged to the reference voltage line RVL may be sensed through the sensing unit 310. In an embodiment, the turn-on duration of the second switch SW2 may be approximately 1 μs, but is not limited thereto.

The sensing unit 310 converts the sensed voltage (hereinafter, referred to as second sensing voltage) into sensing data Vsen and provides the sensing data to the timing controller 140, and the timing controller 140 may detect burnt defects based on the sensing data Vsen. For example, the timing controller 140 may determine that a burnt defect has occurred in the corresponding sub-pixel SP when the difference between the reference voltage Vprer or the first sensing voltage obtained from the first detection and the second sensing voltage exceeds a predetermined or selected second threshold value.

Typically, it may not be easy to measure small voltage variations due to leakage. Therefore, the display device 100 according to an embodiment may perform multiple sensing of the charged voltage in the reference voltage line RVL for the sub-pixel SP. In this embodiment, the timing controller 140 may make a final determination of burnt defects for the corresponding sub-pixel SP when the number of detected burnt defects exceeds a predetermined or selected threshold value.

In an embodiment, multiple second detection periods T2 may be included within a single blank time. That is, the timing controller 140 may perform the second detection multiple times for the same sub-pixel SP or pixel line during a single blank time. Alternatively, to prevent the blank time from becoming too long, the timing controller 140 may perform the second detection multiple times for the same sub-pixel SP or pixel line across multiple frames with multiple blank times.

In this way, the display device 100 according to an embodiment may detect defects such as panel burnt in real-time through the display driving on the display panel 110. When panel burnt is detected during the display driving, real-time sensing of characteristic values of the sub-pixel SP may be omitted.

The defect detection during the display driving may be specifically carried out through the first detection period T1 and the second detection period T2 during the blank time. The turn-on periods of the second switch SW2 in the first detection period T1 and the second detection period T2 may be set to have intervals of approximately one to several microseconds (us). That is, the display device 100 according to an embodiment may accurately detect burnt by performing the first detection (i.e., detecting the output voltage of the reference voltage line RVL with respect to the reference voltage Vprer) and the second detection (i.e., detecting the floating voltage of the reference voltage line RVL) within a short time interval, significantly reducing the blank time.

Figure 11:
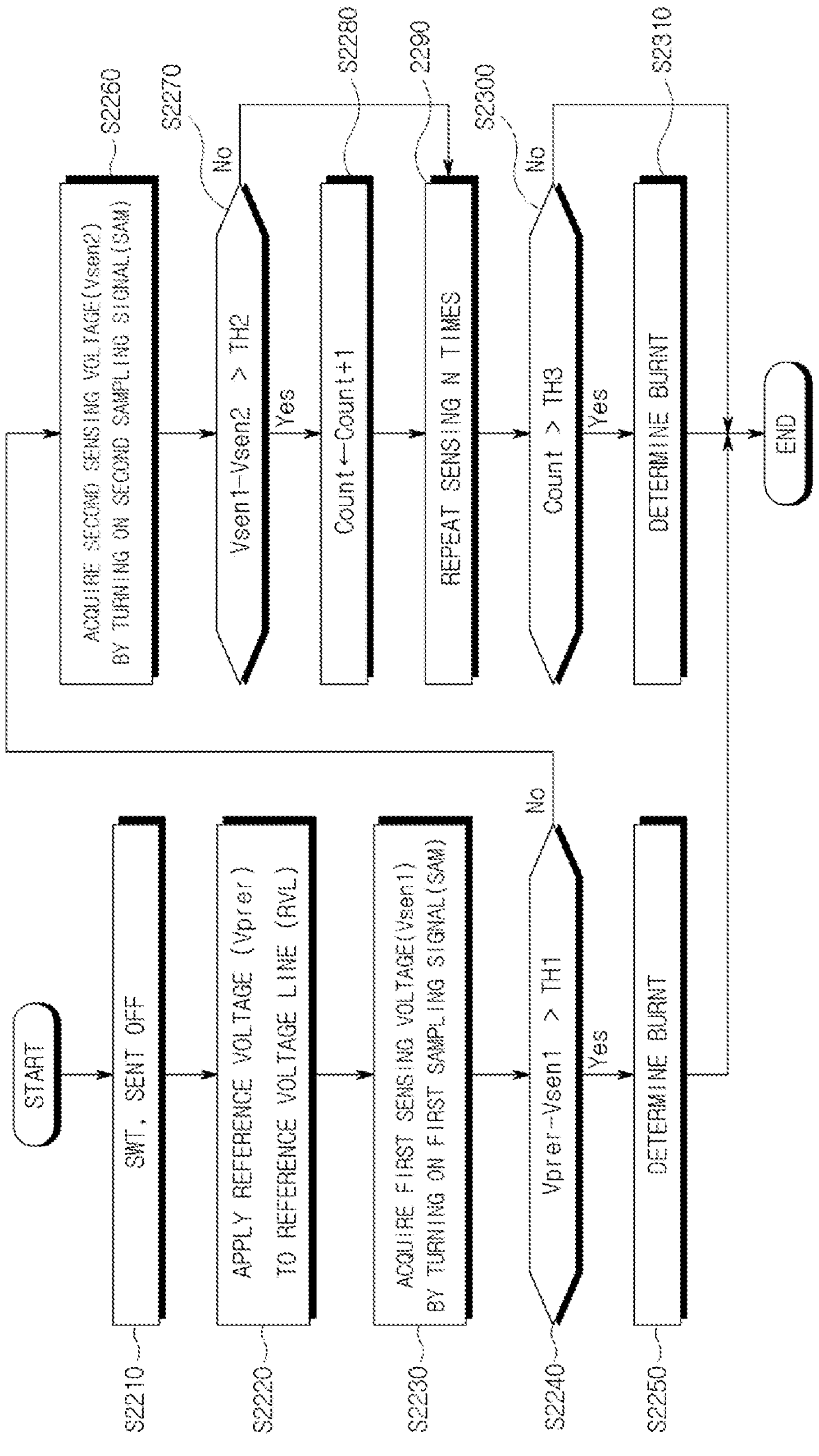
FIG. 11 is a flowchart illustrating a burnt detection method according to an embodiment.

FIG. 11 is a flowchart illustrating a burnt detection method according to an embodiment.

With reference to FIG. 11, a driving method of a display device 100 according to an embodiment detects defects such as panel burnt during the display driving of an image.

This driving method includes turning off a sensing signal SENSE switching transistor SWT and a sensing transistor SENT at a step S2210 by controlling a scan signal SCAN applied to a sub-pixel SP at the turn-off level during a blank time within a single frame, and applying a reference voltage Vprer to a reference voltage line RVL at step S2220 by turning on the first switch SW1. The driving method further includes acquiring the first sensing voltage Vsen1 of the reference voltage line RVL at step S2230 during the application of the reference voltage Vprer by turning on the first sampling signal SAM, and determining burnt at step S2250 when the difference between the reference voltage Vprer and the first sensing voltage Vsen1 is equal to or greater than the first threshold value TH1 at step S2240.

The driving method further includes acquiring the second sensing voltage Vsen2 of the reference voltage line RVL at step S2260, when the difference between the reference voltage Vprer and the first sensing voltage Vsen1 is less than the first threshold value TH1, by suspending application of the reference voltage Vprer and turning on the second switch SW2 as a second turn-on, and increasing the count value Count at step S2280, when the difference between the first sensing voltage Vsen1 and the second sensing voltage Vsen2 is equal to or greater than the second threshold value TH2 step S2270. The driving method may turn on and off the second switch SW2 N times to perform $N^{th}$ sensing of the second sensing voltage Vsen2 at step S2290 to determine whether the difference between the first sensing voltage Vsen1 and the second sensing voltage Vsen2 is equal to or greater than the second threshold value TH2. The driving method further include determining burnt at step S2310 when the final count value Count is greater than the third threshold value TH3 at step S2300.

By employing the above-described driving method, it is possible to reduce the blank time by minimizing or reducing the time used for detecting panel burnt in a display panel 110 and improve the panel burnt detection accuracy by using the reference voltage line to which the reference voltage is directly supplied.

A display device and driving method thereof according to embodiments are capable of reducing burnt defect detection time and the blanking periods by detecting burnt defects of the display panel during the display driving of images.

A display device and driving method thereof according to embodiments are capable of increasing the driving frequencies of the display by reducing the blanking period in a frame, allowing for the fast operation of high-luminance display devices.

A display device and driving method thereof according to embodiments are capable of improving detection accuracy by directly supplying reference voltage to the reference voltage lines and using the reference voltage lines to detect burnt defects.

A display device and driving method thereof according to embodiments are capable of detecting burnt defects in real time during display operation, allowing for quick response and preventing additional damage.

Although embodiments of this disclosure have been described above with reference to the accompanying drawings, it will be understood that the technical configuration of the this disclosure described above can be implemented in other specific forms by those skilled in the art without changing the technical concept or features of the present disclosure. Therefore, it should be understood that the embodiments described above are examples and not limited in all respects. In addition, it should be understood that all modifications or variations derived from the meaning and scope of the claims and their equivalent concept are included within the scope of the this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel including a sub-pixel arranged thereon and configured to display an image;

a power controller that, in operation, supplies a reference voltage to the sub-pixel;

a sensing circuit that, in operation, senses a voltage of the sub-pixel during a blank time within a frame during display driving of the image; and a timing controller that, in operation, detects a defect of the display panel based on the voltage sensed during the display driving, wherein the sensing circuit, in operation:

acquires a first sensing voltage through a first sensing during a first detection period during which the reference voltage is supplied to the sub-pixel; and acquires a second sensing voltage through a second sensing during a second detection period during which supply of the reference voltage to the sub-pixel is interrupted.

2. The display device of claim 1, further comprising:

a reference voltage line coupled to the sub-pixel;

a first switch configured to control a first connection between the power controller and the reference voltage line; and a second switch configured to control a second connection between the reference voltage line and the sensing circuit.

3. The display device of claim 2, wherein:

during the first detection period, the first switch is turned onto supply the reference voltage to the reference voltage line and the second switch is turned on to sense the voltage fed back in response to the reference voltage in the reference voltage line; and during the second detection period, the first switch is turned off and the second switch is turned on to sense the voltage charged in the reference voltage line.

4. The display device of claim 1, wherein the timing controller determines a defect based on a difference between the reference voltage and the first sensing voltage being equal to or greater than a first threshold value and based on a difference between the first sensing voltage and the second sensing voltage being equal to or greater than a second threshold value.

5. The display device of claim 4, wherein a number of defect determinations results from the sensing circuit performing the second sensing for part of a plurality of sub-pixels a plurality of times, and the timing controller makes a final defect determination for the part based on the number being greater than a selected value.

6. The display device of claim 1, wherein the timing controller controls sensing of the sub-pixel according to a first mode or a second mode, the first mode including sensing a characteristic value of a component included in the sub-pixel, and the second mode including sensing the defect of the display panel through the first sensing and the second sensing.

7. The display device of claim 1, wherein the sub-pixel comprises:
an organic light emitting diode;
a driving transistor configured to control driving current applied to the organic light emitting diode;
a switching transistor configured to transfer data voltage to the driving transistor; and
a sensing transistor configured to control a connection between a reference voltage line applied with the reference voltage and the driving transistor.

8. The display device of claim 7, wherein the switching transistor and the sensing transistor are turned off during the blank time.

9. The display device of claim 7, wherein the power controller, in operation:
applies a display reference voltage to the reference voltage line during an active time within the frame; and
applies a sensing reference voltage different in voltage level from the display reference voltage to the reference voltage line during the blank time.

10. The display device of claim 9, wherein the sensing reference voltage is higher in voltage level than the display reference voltage.

11. A method, comprising:
driving a display device operating with a frame including an active time for displaying an image and a blank time following the active time;
performing primary detecting of a defect of a display panel by supplying a reference voltage to a sub-pixel during the blank time and performing a first sensing of a voltage of the sub-pixel during the supplying a reference voltage; and
performing secondary detecting of the defect of the display panel by stopping supply of the reference voltage and performing a second sensing of the voltage of the sub-pixel during the stopping supply.

12. The method of claim 11, wherein the performing primary detecting comprises:
interrupting application of a scan signal and a sensing signal for the sub-pixel;
supplying the reference voltage to the sub-pixel; and
sensing the voltage fed back in response to the reference voltage in a reference voltage line associated with the sub-pixel.

13. The method of claim 12, wherein the performing secondary detecting comprises:
interrupting the supply of the reference voltage; and
sensing the voltage charged in the reference voltage line.

14. The method of claim 11, wherein:
the primary-detecting comprises:
comparing a difference between the reference voltage and a first sensing voltage acquired through the sensing with a first threshold value; and
determining the defect based on the difference between the reference voltage and the first sensing voltage being equal to or greater than the first threshold value; and
the secondary-detecting comprises:
comparing a difference between the first sensing voltage and a second sensing voltage acquired through the second sensing with a second threshold value; and
determining the defect based on the difference between the first sensing voltage and the second sensing voltage being equal to or greater than the second threshold value.

15. The method of claim 11, wherein:
the display device comprises:
a first switch configured to control a connection between a power controller outputting the reference voltage and a reference voltage line of the sub-pixel; and
a second switch configured to control a connection between the reference voltage line and a sensing circuit for sensing the voltage of the sub-pixel;
the performing primary detecting comprises turning on the first switch and turning on the second switch during the turning on the first switch; and
the performing secondary detecting comprises turning off the first switch and turning on the second switch during the turning off the first switch.

16. The method of claim 11, wherein the performing secondary detecting is performed a plurality of times to make a final determination of the defect of the sub-pixel based on a number of defect determinations resulting from the performing second detecting being equal to or greater than a selected value.

17. The method of claim 11, further comprising sensing a characteristic value of a circuit component included in the sub-pixel during the blank time according to a sensing mode.

18. The method of claim 11, further comprising applying a display reference voltage different in voltage level from the reference voltage to the sub-pixel during the active time.

19. A display device, comprising:
a display panel including a sub-pixel arranged thereon;
a reference voltage line associated with the sub-pixel;
a power controller that, in operation, supplies a reference voltage;
a sensing circuit that, in operation, senses a voltage on the reference voltage line;
a first switch that, in operation:
in a first detection period, connects the reference voltage line to the power controller to charge the reference voltage line by the reference voltage; and
in a second detection period following the first detection period, disconnects the reference voltage line from the power controller;
a second switch that, in operation, in the first and second detection periods, connects the reference voltage line to the sensing circuit in response to a sampling signal; and
a timing controller that, in operation, detects a defect of the sub-pixel based at least one of:
a first sensing voltage generated by sampling the voltage on the reference line by the sensing circuit in the first detection period; and
a second sensing voltage generated by sampling the voltage on the reference line by the sensing circuit in the second detection period.

20. The display device of claim 19, wherein the timing controller, in operation:

in the first detection period, detects the defect by:

determining whether a difference between the reference voltage and the first sensing voltage exceeds a first threshold value; and in response to the difference exceeding the first threshold value, determining that the defect is present in the sub-pixel; and in the second detection period, detects the defect by:

determining whether a difference between the first sensing voltage and the second sensing voltage exceeds a second threshold value; and in response to the difference exceeding the second threshold value, determining that the defect is present in the sub-pixel.

* * * * *